United States Patent
Oh et al.

(10) Patent No.: US 8,219,717 B2
(45) Date of Patent: Jul. 10, 2012

(54) PORT SETTING METHOD OF APPLICATION SYSTEM

(75) Inventors: Sang Chul Oh, Daejeon (KR); Nam Hoon Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 77 days.

(21) Appl. No.: 12/809,309

(22) PCT Filed: Sep. 11, 2008

(86) PCT No.: PCT/KR2008/005394
§ 371 (c)(1),
(2), (4) Date: Jun. 18, 2010

(87) PCT Pub. No.: WO2009/078553
PCT Pub. Date: Jun. 25, 2009

(65) Prior Publication Data
US 2011/0125932 A1 May 26, 2011

(30) Foreign Application Priority Data
Dec. 18, 2007 (KR) .................. 10-2007-0133777

(51) Int. Cl.
*G06F 3/00* (2006.01)
(52) U.S. Cl. ............... 710/7; 710/36; 710/43; 710/62
(58) Field of Classification Search .................. None
See application file for complete search history.

(56) References Cited

U.S. PATENT DOCUMENTS
6,438,590 B1* 8/2002 Gartner et al. ............. 709/219
7,599,999 B1* 10/2009 Armstrong et al. ........ 709/216
2005/0141525 A1 6/2005 Rose
2005/0246715 A1* 11/2005 Herity ...................... 719/315
2007/0160071 A1 7/2007 Overtoom et al.

FOREIGN PATENT DOCUMENTS
JP 2005-339536 12/2005
(Continued)

OTHER PUBLICATIONS
Gokhale et al.,"Optimizing CORBA Internet Inter-ORB Protocol (IIOP) Engine for Minimal Footprint Embedded Multimedia Systems," IEEE, Sep. 1999, pp. 1673-1706.*
Kuhns et al., "An Overview of the Real-Time CORBA Specification,"IEEE, 2000, pp. 56-63.*
Kim, Saehwa et al., "SCA-based Component Software Framework for SDR," IEEE Workshop on Software Technologies for Future Embedded Systems, (2003).

*Primary Examiner* — Eron J Sorrell
(74) *Attorney, Agent, or Firm* — Nelson Mullins Riley & Scarborough LLP; EuiHoon Lee, Esq.

(57) ABSTRACT

A port setting method of an application system comprises: requesting a naming server for object information corresponding to name information of the other components upon data transmission to the other components; determining whether there exists consistent information based on the object information of the other components received from the naming server; if there exists consistent information, selecting a first and certain protocol, and otherwise, selecting a second protocol; and establishing a connection with the other components by use of the selected protocol. The actual location of the components can be sensed based on Endpoint information of IOR without adding no particular information to the domain profile (xml profile), and a more efficient protocol can be selected depending on the position of each component, thereby enhancing data transmission performance and efficiency in SCA port communications between components.

8 Claims, 5 Drawing Sheets

FOREIGN PATENT DOCUMENTS

| KR | 1020040002624 | 1/2004 |
| KR | 10-0554521 | 2/2006 |
| KR | 10-0590730 | 6/2006 |
| KR | 1020070061084 | 6/2007 |

* cited by examiner

[Fig. 1]
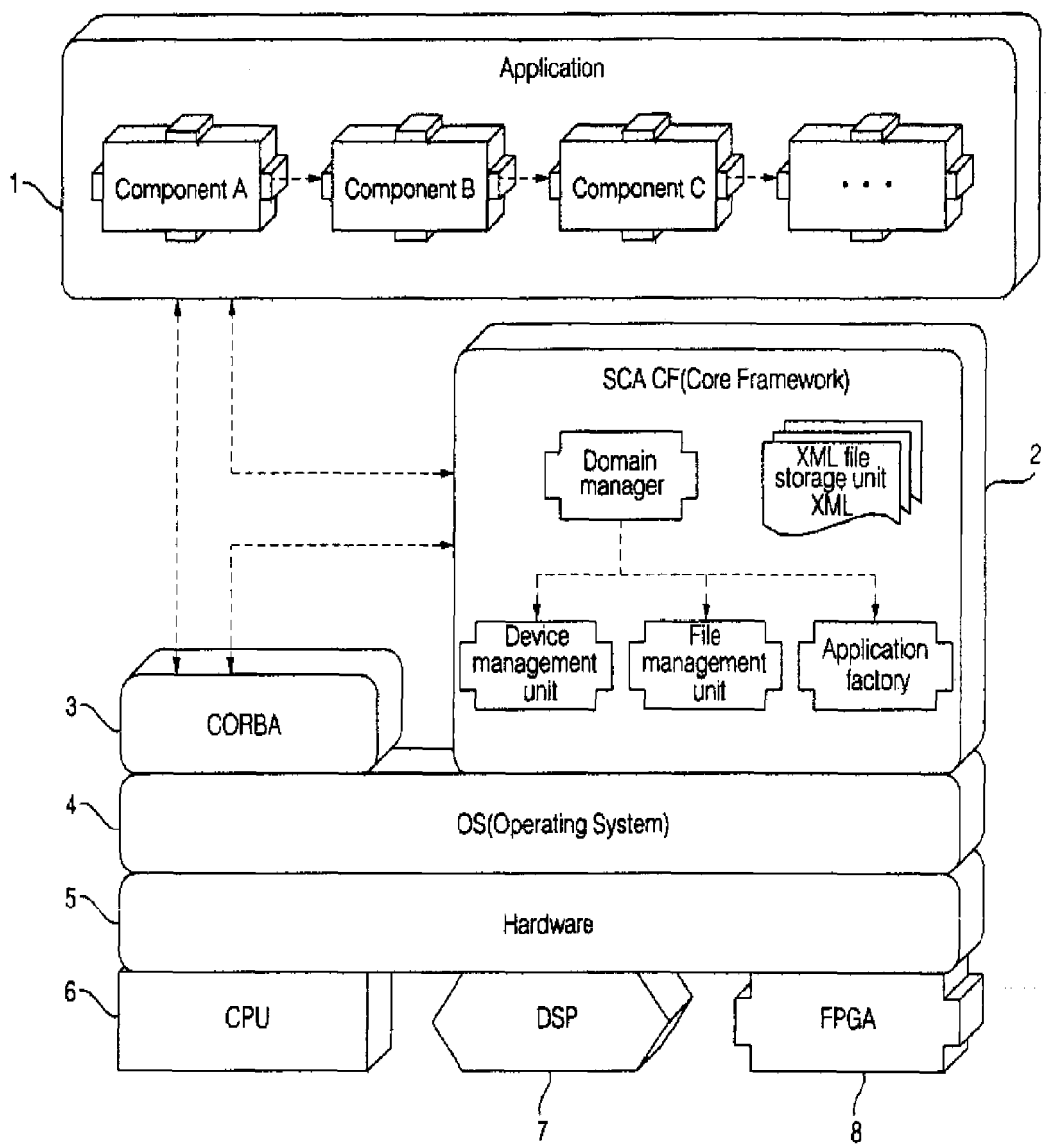

[Fig. 2]
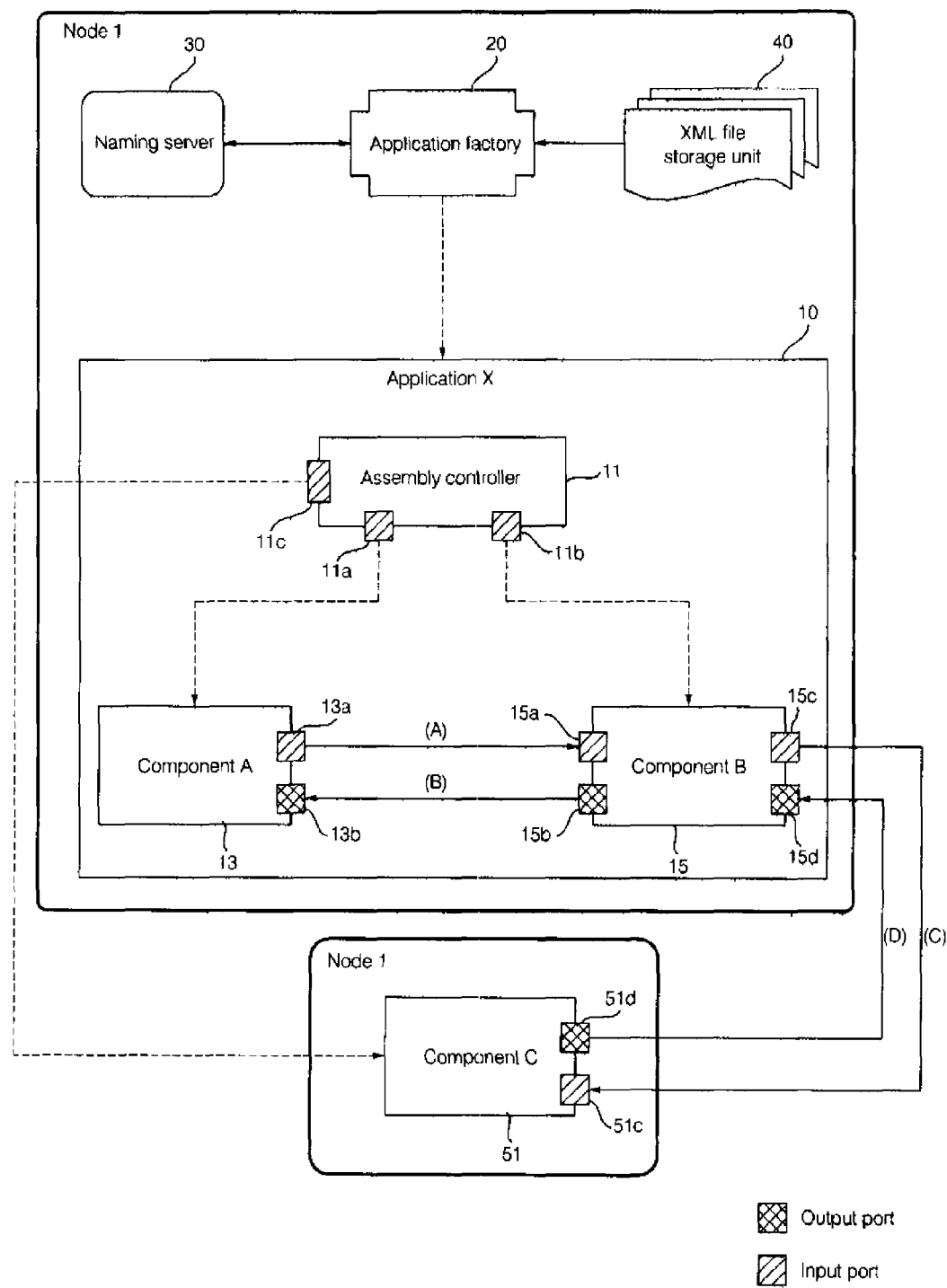

[Fig. 3]
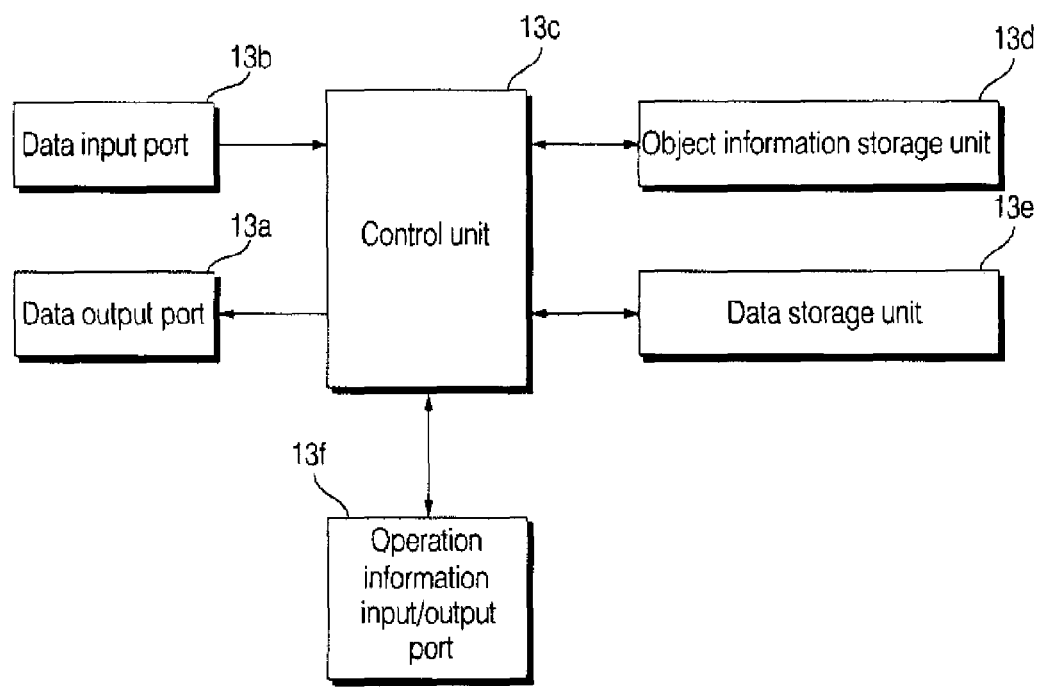

[Fig. 4]
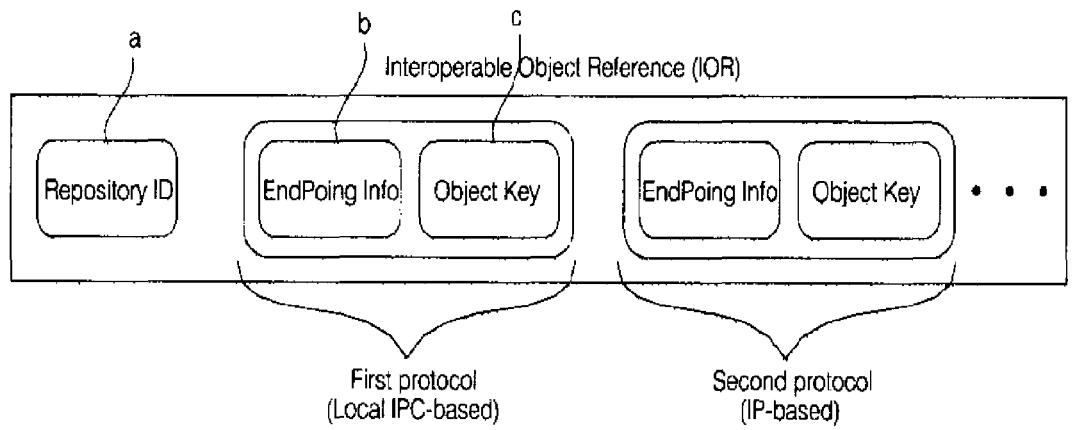
(a)
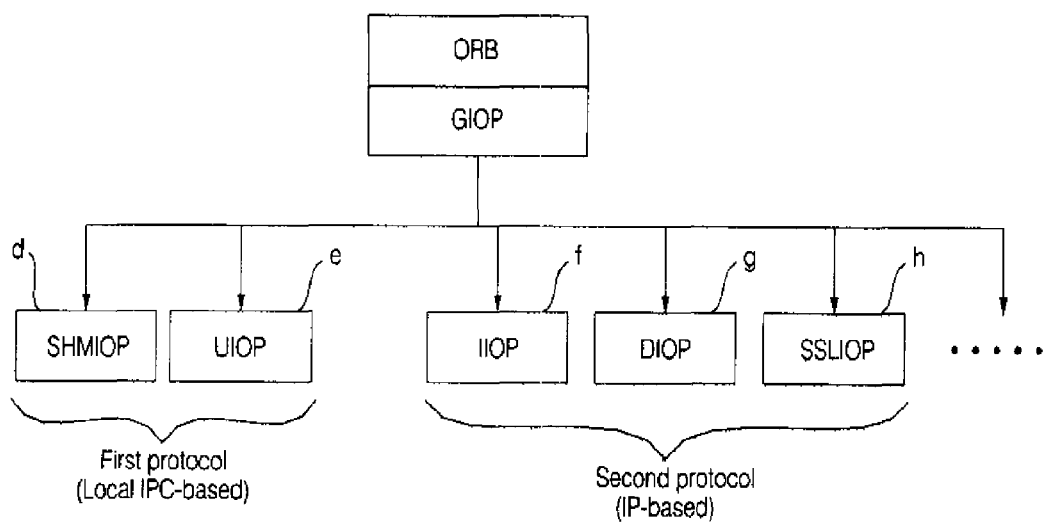
(b)

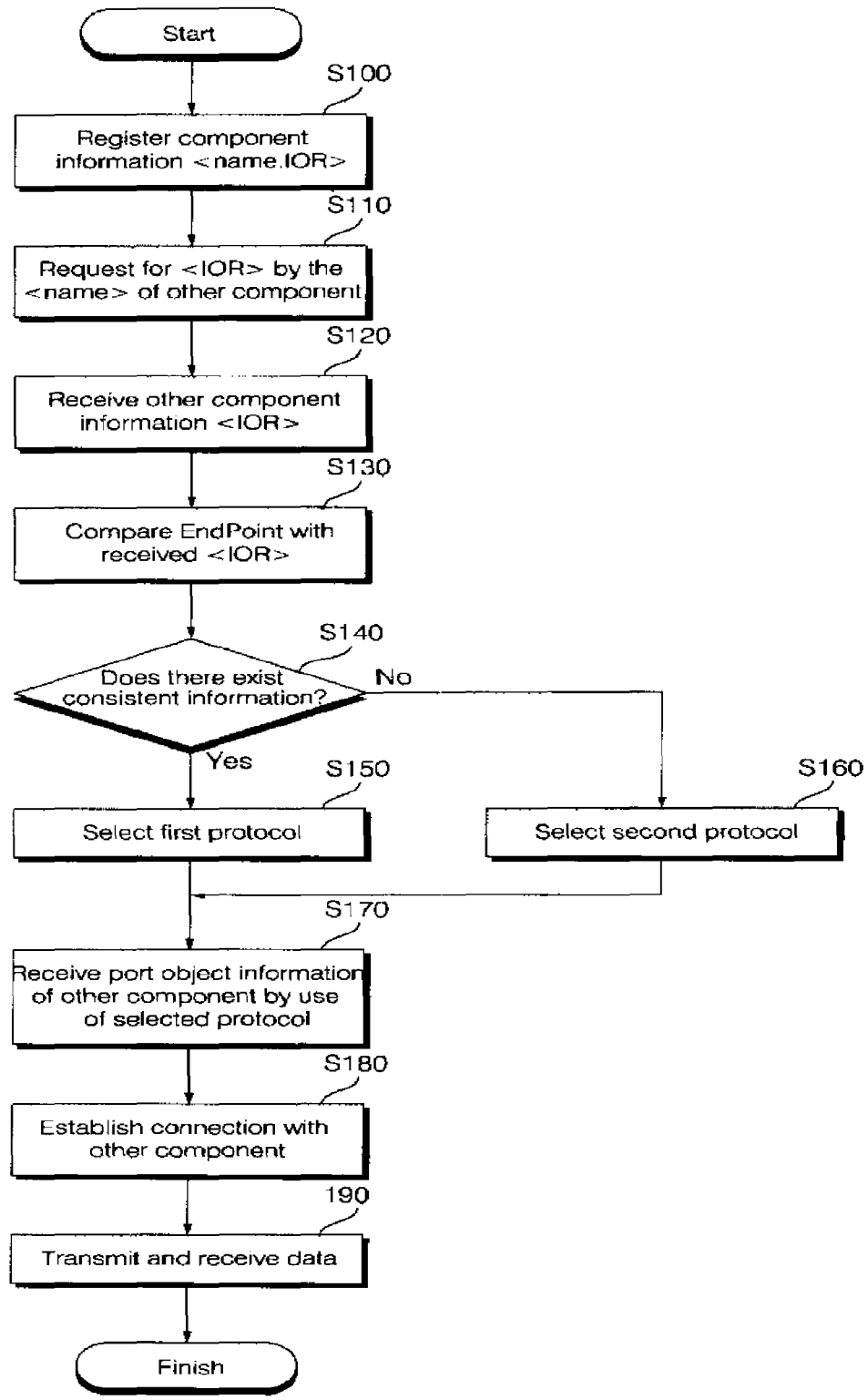
[Fig. 5]

PORT SETTING METHOD OF APPLICATION SYSTEM

RELATED APPLICATIONS

This application is a 35 U.S.C. §371 national stage filing of PCT Application No. PCT/KR2008/005397 filed on Sep. 11, 2008, which claims priority to, and the benefit of, Korean Patent Application No. 10-2007-0133777 filed on Dec. 18, 2007. The contents of the aforementioned applications are hereby incorporated by reference.

TECHNICAL FIELD

The present invention relates to a port setting method of an application system, and more particularly, to a port setting method of an application system, which allows to select a more efficient protocol depending on the actual location of each component.

The present invention was supported by the IT R&D program of Ministry of Information and Communication (MIC) and Institute for Information Technology Advancement (IITA) [Project No.: 2006-S-012-02, Project Title: Middleware platform development for SDR terminal]

BACKGROUND ART

Generally, in an application system, an application, which functions as one waveform, is executed by combining and disposing various components in one package.

When the application is driven, each of components thereof is capable of data transmission/reception through a procedure in which an application factory sets a connection using connection data comprising a pair of input/output ports between the components described in the domain profile (XML file). Such connection information defined by the connection of input/output ports has to be defined and set between all the components requiring communication in one application. Such inter-component connection information and port information is defined and managed in an XML file.

However, when transmitting and receiving data by the connection thus made, each component transmits and receives data using the same CORBA transport protocol regardless of the position of the other components, and this leads to deterioration in data transmission efficiency.

DISCLOSURE OF INVENTION

Technical Problem

It is an object of the present invention to provide a port setting method of an application system, which can increase data transmission efficiency by detecting actual location information of components and transmitting and receiving data using a different protocol between the components based on the detected position information of each component.

Technical Solution

A port setting method of an application system according to the present invention comprises: requesting a naming server for object information corresponding to name information of the other components upon data transmission to the other components; determining whether there exists consistent information based on the object information of the other components received from the naming server; selecting a certain protocol according to the result of determination; and establishing a connection with the other components by use of the selected protocol.

Furthermore, the method further comprises: sensing EndPoint information contained in the object information of the other components for comparison.

If there exists consistent information among the object information of the other components, it is sensed that the other components are components belonging to the same node, and if there exists no consistent information among the object information of the other components, it is sensed that the other components are components belonging to a remote node.

Advantageous Effects

The actual location of the components can be sensed based on Endpoint information of IOR without adding no particular information to the domain profile (xml profile), and a more efficient protocol can be selected depending on the position of each component, thereby enhancing data transmission performance and efficiency in SCA port communications between components.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a view referred to for describing an SCA according to one embodiment of the present invention;

FIG. 2 is a view referred to for describing the configuration of an application system according to one embodiment of the present invention;

FIG. 3 is a view referred to for describing the configuration of a component according to one embodiment of the present invention;

FIG. 4 is a view referred to for describing the operation of an application system according to one embodiment of the present invention; and FIG. 5 is a sequential diagram showing an operation flow for a port setting method of an application system according to one embodiment of the present invention.

BEST MODE FOR CARRYING OUT THE INVENTION

Hereinafter, an embodiment of the present invention will be described below with reference to the accompanying drawings.

FIG. 1 is a view referred to for describing an SCA according to one embodiment of the present invention. A Software Communications Architecture (SCA) is a standardized software communications architecture which was suggested by the Joint Tactical Radio System (JTRS) and the Joint Program Office (JPO) in order to greatly enhance interoperability between communication systems and reduce development and set-up costs. The SCA is composed of a hierarchical structure of an application 1 and an operating environment.

Among these, the operating environment includes a real-time operating system (RTOS) 4 to 8, a core framework (CF) 2, and a common object request broker architecture (CORBA) interface 3. The SCA provides an integrated environment of heterogeneous hardware and software by employing CORBA, which is the industrial standard for a distributed object model, as middleware. That is, the SCA, other than limited to a specific system, is formed as an independent system design framework.

Hardware includes a central processing unit (CPU) 6, a digital signal processor (DSP) 7, a field programmable gate array (FPGA) 8, and hardware 5 of the same type is located on an upper level. Additionally, the operating system (OS) 4 exists on an upper level over the hardware, and the CORBA 3 and the SCA CF 2 exist on an upper level over the OS 2.

Here, various components of the upper-level application 1 are set up in the corresponding hardware and executed by various managers included in the CF 2 based on the domain profile of an XML file format that exists in the SCA core framework 2.

FIG. 2 is a view referred to for describing the configuration of an application system according to one embodiment of the present invention.

The application system according to the present invention relates to an application system based on a software communications architecture (hereinafter, referred to as 'SCA'), and includes a certain application X 10, a naming server 30, an XML (Extensible Markup Language) file storage unit 40, and an application factory 20.

Further, the certain application X 10 includes an assembly controller 11, a component A 13, a component B 15, and a component C 51. The component A 13 and the component B are components belonging to the same node (node 1), and the component C is a component belonging to a remote node (node 2).

Here, the components are defined as software modules or elements for implementing a complete set of functions, and they are typically in a shared library format but are one of source files written in binary codes, byte codes, or a script language according to the setup environment.

At this time, the assembly controller 11 controls the driving of all the components belonging to the node 1 and the node 2.

As the certain application X 10 is set up and driven, the naming server 30 receives a registration request signal from the assembly controller 11 and the components, and then registers the names and IOR (Interoperable Object Reference) information of the assembly controller 11 and components A, B, and C.

At this time, upon receipt of output data object information containing the name of another component for data transmission from a certain component in the SCA-based application system, the naming server 40 delivers IOR information of the corresponding component among the registered information.

The XML file storage unit 40 stores an XML file defining driving information of all the components in the SCA-based application system. The XML file provides a mechanism for putting restrictions on storage, setup and logical structure, and is constructed in an Extensible Markup Language (XML) for describing the classification of a data object and the activity of a computer program processing this classification, and stored in an entity.

Here, the driving information is information for selectively driving only the component required for the execution of the corresponding application as a certain application is set up in the assembly controller 11 and executed.

Meanwhile, the assembly controller 11 controls the driving of all the components, i.e., the component A 13, component B 15, and component C 51, in the SCA-based application system. At this time, the assembly controller 11 is provided with output ports 11a, 11b, and 11c for controlling the driving of the component A 13, component B 15, and component C 51.

Further, the assembly controller 11 selectively drives the component required for the execution of the corresponding application among all the components in the SCA-based application system by analyzing the XML file stored in the XML file storage unit 30.

Here, the configuration of the components will be described in more detail with reference to FIG. 3. The configuration of the components of FIG. 3 will be described by way of example of the component A of FIG. 2. However, it is needless to say that the component B and component C also includes the same elements.

As shown in FIG. 3, the component A 13 according to the present invention includes a data output port 13a, a data input port 13b, a control unit 13c, an object information storage unit 13d, a data storage unit 13e, and an operation information input/output port 13f.

First, the data input port 13b and the data output port 13a are for mutual communication with the other components 15 and 51. A connection for each data port in the SCA is defined to be unidirectional, and, hence, the data input port 13b and the data output port 13a are separately designated.

With regard to the data input port 13b and the data output port 13a, one of two data ports becomes the data input port 13b and the other one becomes the data output port 13a according to port object reference to be stored in the object information storage unit.

The object information storage unit 13d stores port object reference received from the assembly controller 11. Here, the port object reference includes input/output port information defining the data input port 13b and data output port 13a of the components and information of a connection with the other components 15 and 51 in the SCA-based application system.

In other words, upon establishing a connection between the component A 13 and the component B 15, input/output port information and connection information about the component B 15 are stored in the object information storage unit 13d of the component A 13, and input/output port information and connection information about the component A 13 are stored in the object information storage unit (not shown) of the component B 15.

The data storage unit 13e stores a predetermined data. At this time, the data to be stored in the data storage unit 13e is transmitted and received via the data input/output ports 13a and 13b in accordance with a command from the control unit 13c.

The operation information input/output port 13f is a port for transmitting and receiving operation information of the component A to and from the assembly controller 11. At this time, the control unit 13c controls the driving of the component A 13 according to the operation information of the component A 13 inputted through the operation information input/output port 13f.

Additionally, the control unit 13c stores port object reference received from the assembly controller 11 in the object information storage unit 13c, and outputs the data stored in the data storage unit 13e to the other components 15 and 51 via the data output port 13a by using the port object reference. Further, the data received from the other components 15 and 51 is inputted via the data input port 13b and stored in the data storage unit 13e.

In other words, as the component A 13, component B 15, and component 51, i.e., all of the components in the SCA-based application system, are driven by the assembly controller 11, they have their names and IOR information registered in the naming server 40. At this time, in the event of data transmission from one of the components to the other components, for example, when it is desired to transmit data from the component B 15 to the component A 13 or component 51, the component B 15 acquires the IOR information based on the name information for the component A 13 or component C 51 by requesting the naming server 40 for the IOR information.

The component B 15 senses EndPoint information contained in the received IOR information, and judges whether the sensed EndPoint information is consistent with its EndPoint information.

If the component B 15 is a component located at the same node (node 1) like the component A 13, the EndPoint information is consistent, while if the component B 15 is a component located at a remote node (node 2) like the component C 51, the EndPoint information is inconsistent.

The component B 15 checks the actual location of the other component in the SCA-based application system according to the consistency of the EndPoint information, and selects a first protocol for the component A 13 of the same node (node 1) and a second protocol for the component C 51 of the remote node (node 2). Here, the first protocol is a local IPC-based protocol, and the second protocol is an IP-based protocol.

Therefore, the component B 15 establishes connections (A, B) by use of the local IP-based protocol for the component of the same node and establishes connections (C, D) by use of the IP-based protocol for the component of the remote node. In other words, the component B 15 receives port object reference (POR) of the other component by use of the selected protocol, and establishes a connection with the other component based on the port object reference.

FIG. 4 is a view referred to for describing the operation of an application system according to one embodiment of the present invention, in which (a) illustrates the configuration of IOR information of CORBA, and (b) illustrates an embodiment according to the classification of transport protocols of CORBA.

First, referring to FIG. 4(*a*), IOR can be conceptually divided into three s: a repository ID (a), EndPoint information (b), and an object key (c).

The repository ID (a) is allocated by an IDL (Interface Definition Language) compiler, and includes an IDL prefix, a type name, a version number, etc. The EndPoint information (b) includes all the information required for an ORB (Object Request Broker) to actually establish a connection. For instance, in case of an IIOP (Internet Inter-ORB Protocol), the EndPoint information (b) includes a domain name (or IP address) and a TCP port number.

The object key (c) is allocated as a reference value of an actual object at the time of generating the actual object. At this time, the EndPoint information (b) and the object key (c) are combined and used information for each transport protocol provided by the ORB, and this information can be implemented a number of times corresponding to the number of transport protocols provided by the ORB of the CORBA.

Although the embodiment of the present invention has been described with respect to a case where CORBA protocols are classified into a local IPC-based first protocol for use in the same node and an IP-based second protocol for use in a remote node, there actually exist various types of transport protocols other than the above protocols.

Referring to FIG. 4(*b*), SHMIOP (Shared Memory Inter-ORB Protocol) (d) and a UNIOP (Unix domain socket Inter-ORB Protocol) (e) belong to the first protocol, and an IIOP (Internet Inter-ORB Protocol) (f), a DIOP (Datagram Inter-ORB Protocol) (g), and an SSLIOP (Secure Sockets Layer Inter-ORB Protocol) (h) belong to the second protocol.

Hence, the first protocol is selected for data transmission between the components at the same node, and the second protocol is selected for data transmission between the components at a remote node. Accordingly, it is possible to prevent data transmission efficiency from being deteriorated by data transmission using an IP-based protocol even for the components at the same node.

The application system according to the present invention thus constructed will be described in more detail through the operation flow therefor.

FIG. 5 is a sequential diagram showing an operation flow for a port setting method of an application system according to one embodiment of the present invention, more specifically, which illustrates the operation flow for a port setting method between components in the application system. In the embodiment of FIG. 5, the operation flow will be described with respect to the component B of FIG. 2.

Referring to FIG. 5, when a driving command is applied from the assembly controller 11, the component B 15 transmits its name and IOR information to the assembly controller 11 through the operation information input/output port to register them in the naming server 40. Of course, the component A 13 and the component C 51 also have their names and IOR information registered in the naming server 40.

The component B 1 requests for IOR information by the name of the component C 51 for data transmission to the component C 51 in S110. At this time, the IOR information about the component C 51 is received from the naming server 40 in S120.

The component B 15 senses EndPoint information from the received IOR information of the component C 51, and compares the EndPoint information with its EndPoint information in S130. Here, the component C 51 is included in a different node, i.e., the node 2, from the node 1 to which the component B 15 belongs, and their respective EndPoint information are not consistent with each other in S140.

Therefore, the component B 15 selects the IP-based second protocol in S160, and receives port object information of the component C 51, i.e., object information for the data input/output ports 51*c* and 51*d*, by use of the selected second protocol in S170. At this time, the component B 15 establishes connections (C, D) with its data input/output ports 15*c* and 15*d* based on the received information about the data input/output ports 51*c* and 51*d* of the component C 5 in S180 and, accordingly, transmits and receives data in S190.

Meanwhile, when it is desired to establish a connection with the component A 13, too, the process steps of S110 to S130 are performed. At this time, the component A 13 belongs to the same node as the node 1 to which the component B 15 belongs, and hence, their respective EndPoint information are consistent with each other in S140.

Consequently, the component B 15 selects the local IPC-based first protocol in S150, and receives port object information of the component A 13, i.e., object information for the data input/output ports 13*a* and 13*b*, by use of the selected first protocol in S170. At this time, the component B 15 establishes a connection with its data input/output ports 15*a* and 15*b* based on the received object information for the data input/output ports 13*a* and 13*b* of the component A 13 in S180, and, accordingly, transmits and receives data in S190.

As described above, the port setting method of the application system according to the present invention is not limited to the configurations and methods of the above-described embodiments, but all or some of the respective embodiments may be selectively combined and executed so that various modifications can be made within the scope of the invention as claimed.

Meanwhile, this invention can be implemented in processor-readable codes in a processor-readable recording medium provided on the SCA-based application system. Here, the processor-readable recording medium includes all kinds of recording devices for storing processor-readable data. Examples of the processor-readable recording medium include includes a computer-readable storage medium such as ROM, RAM, a CD-ROM, magnetic tapes, a hard disk, floppy disks, and optical data storage devices, and a means implemented in the form of carrier waves, for example, transmission via Internet. The processor-readable recording medium may be distributed among computer systems connected to a network, and processor-readable codes may be stored and executed in a decentralized fashion.

Although the air conditioner and the operating method thereof according to the present invention have been described with reference to the illustrated drawings, these are merely illustrative, and those skilled in the art will understand that various modifications and equivalent other embodiments of the present invention are possible. The present invention is not limited to the embodiments and drawings disclosed in this specification, and can be applied within the scope of the technical concept of the present invention.

INDUSTRIAL APPLICABILITY

The present invention can be applied to an application system, thereby selecting a more efficient protocol depending on the actual location of each component.

The invention claimed is:

1. A port setting method of an application system, comprising:
   requesting a naming server for object information corresponding to name information of other components upon data transmission to the other components;
   sensing EndPoint information contained in the object information of the other components received from the naming server;
   determining whether there exists consistent information based on the EndPoint information of the object information of the other components;
   if there exists consistent information among the object information of the other components, sensing that the other components are components belonging to the same node;
   if there exists no consistent information among the object information of the other components, sensing that the other components are components belonging to a remote node;
   selecting a certain protocol according to the result of determination; and
   establishing a connection with the other components by use of the selected protocol.

2. The method of claim 1,
   wherein, in the selection step, if there exists consistent information based on the object information of the other component, selecting a first protocol, and
   wherein the first protocol is a local IPC-based protocol.

3. The method of claim 2, wherein the first protocol comprises at least one of a SHMIOP (Shared Memory Inter-ORB Protocol) and a UNOP (Unix domain socket Inter-ORB Protocol).

4. The method of claim 1, wherein, in the selection step, if there exists no consistent information based on the object information of the other component, selecting a second protocol.

5. The method of claim 4, wherein the second protocol is an IP-based protocol.

6. The method of claim 4, wherein the second protocol includes at least one of an IIOP (Internet Inter-ORB Protocol), a DIOP (Datagram Inter-ORB Protocol), and an SSLIOP (Secure Sockets Layer Inter-ORB Protocol).

7. The method of claim 1, further comprising:
   registering the name and object information of at least one component in the naming server.

8. A non-transitory processor-readable recording medium having a program recorded therein for executing the port setting method of claim 1 in the processor.

* * * * *